United States Patent [19]

Carollo et al.

[11] 4,427,977

[45] Jan. 24, 1984

[54] VIDEO IMAGE SIMULATION APPARATUS

[75] Inventors: Jerome T. Carollo; John A. Waidelich, Jr., both of Ormond Beach, Fla.

[73] Assignee: The United States of America as represented by the Secretary of the Navy, Washington, D.C.

[21] Appl. No.: 290,552

[22] Filed: Aug. 6, 1981

[51] Int. Cl.³ .............................................. G09G 1/28
[52] U.S. Cl. .................................. 340/702; 340/705; 340/795; 350/96.18; 358/104; 358/250; 358/901; 353/33; 353/81; 434/43
[58] Field of Search ...................... 340/702, 705, 795; 350/96.11, 96.18; 358/104, 250, 901; 353/33, 81; 434/43

[56] References Cited

U.S. PATENT DOCUMENTS

| | | | |
|---|---|---|---|
| 2,747,460 | 5/1956 | Calvi | 353/33 |
| 3,205,303 | 9/1965 | Bradley | 358/210 |
| 3,449,037 | 6/1969 | Koester | 350/96.18 |
| 3,900,703 | 9/1975 | Tickle | 358/104 |
| 3,901,220 | 8/1975 | Koyasu et al. | 128/6 |
| 3,983,474 | 9/1976 | Kuipers | 324/207 |
| 4,103,435 | 8/1978 | Herndon | 434/43 |
| 4,189,145 | 2/1980 | Stubben et al. | 273/313 |
| 4,209,832 | 6/1980 | Gilham et al. | 364/521 |
| 4,269,476 | 5/1981 | Gauthier et al. | 350/174 |
| 4,315,241 | 2/1982 | Spooner | 340/27 R |
| 4,322,726 | 3/1982 | Collier et al. | 340/705 |

OTHER PUBLICATIONS

Winner, R. N., "A Color Helmet Mounted Display System", *Proceedings of a Symposium on Visually Coupled Systems: Development and Applications*, Aerospace Medical Research Laboratory, Nov. 8-10, 1972, pp. 335-360.

Sawamura, R. T., "The Ultrasonic Advanced Helmet-Mounted Sight", *Proceedings of a Symposium on Visually Coupled Systems: Development and Applications*, Aerospace Medical Research Laboratory, Nov. 8-10, 1972, pp. 363-381.

Haywood, Wesley T., Jr., "A New Precision Electro-Optical Technique for Measuring Pilot Line of Sight in Aircraft Coordinates", *Proceedings of a Symposium on Visually Coupled Systems: Development and Applications*, Aerospace Medical Research Laboratory, Nov. 8-10, 1972, pp. 384-396.

Kuipers, Jack, "The SPASYN, A New Transducing Technique for Visually Coupled Control Systems", *Proceedings of a Symposium on Visually Coupled Systems: Development and Applications*, Aerospace Medical Research Laboratory, Nov. 8-10, 1972, pp. 398-416.

Chatten, John B., "Foveal Hat, A Head Aimed TV System with Foveal/Peripheral Image Format", *Proceedings of a Symposium on Visually Coupled Systems: Development and Applications*, Aerospace Medical Research Laboratory, Nov. 8-10, 1972, pp. 423-444.

Merchant, John, et al., "Aerospace Medical Research Laboratory/Honeywell Remote Oculometer", *Proceedings of a Symposium on Visually Coupled Systems: Development and Applications*, Aerospace Medical Research Laboratory, Nov. 8-10, 1972, pp. 499-521.

W. P. Siegmund, R. E. Innis, C. J. Koester and W. J. Gamble; Fiber Optics Principles and Applications in Medicine; 3/31/69; pp. 47-59.

S. Woodcock and J. D. Leyland; High-Resolution CRTs and Their Application to Helmet-Mounted Displays; Proceedings of the SID, vol. 20/2, Second Quarter, 1979; pp. 105-109.

*Primary Examiner*—David L. Trafton
*Attorney, Agent, or Firm*—Robert F. Beers; Robert W. Adams

[57] ABSTRACT

A video display system employs a plurality of controlled cathode ray tubes producing individual images which are combined by dichroic prisms to form a single image which is transmitted by a fiber-optic cable to a set of optical elements which transmit the image to the viewer. The position and orientation of the viewing instrument are sensed to provide control signals to an image generator to provide an image appropriate to the orientation of the viewing instrument.

1 Claim, 5 Drawing Figures

VIDEO IMAGE SIMULATION APPARATUS

The invention described herein was made in the course of or under Contract No. N61339-78-C-0166 with the U.S. Navy.

BACKGROUND OF INVENTION

1. Field of the Invention

This invention relates to video image display apparatus, and, more particularly, to such apparatus in which the scene displayed is determined by the sensed orientation of the viewing mechanism as controlled by the user.

2. Description of the Prior Art

Prior art video display devices, such as that described in U.S. Pat. No. 3,205,303, issued Sept. 7, 1965 to W. E. Bradley, include a CRT mounted upon the helmet of the user with a combination of control equipment located separately from the CRT's. The apparatus includes a mechanical or electromagnetic device for sensing the position of the user's head, so that the scene depicted is changed dependent upon the user's head position. An image pickup device, such as a TV camera tube, is employed to pick up an image from a model scene and transmit it to the CRT mounted upon the user's helmet. U.S. Pat. No. 4,103,435, issued Aug. 1, 1978 to Herndon, discloses a head trackable wide angle system for displaying a portion of a model to the user displayed upon a screen positioned in front of the user's face. Such devices are limited in scene capability to those drawn or depicted upon a screen within the range of the pickup device, and require the user to support the CRT from his helmet.

An electronic image generation system is disclosed in U.S. Pat. No. 4,209,832, issued June 24, 1980 to Gilham et al. Gilham et al describes a fire control combat simulator in which information representing objects to be displayed is stored in a plurality of image generators. A computer composes a scene for the operator's TV monitor consisting of one or more of the objects stored in the object generators. The host computer receives analog rate signals from the operator's controls from which it determines the direction of view and displays objects from the separate object generators to be displayed on the operator's TV monitor. Such systems are limited to those applications in which a TV monitor is an adequate display.

SUMMARY OF THE INVENTION

An object of the present invention is to provide a display simulator which includes an optical viewing device for the user which displays directly to the user an image dictated by a sensed position of the user's viewing instrument. A more specific object of the present invention is to provide a display system for providing a scene determined by a computer in response to the sensed position of the user's viewing instrument, and which includes a plurality of computer controlled image generators, located remotely from the user whose images are optically combined and transmitted via a fiber-optic cable to the user's viewing instrument.

Accordingly, the present invention discloses a display simulator including a plurality of computer controlled image generators which control respective cathode ray tubes which produce separate images, a computer which dictates image content in response to signals received by the computer indicative of the position of the viewing instrument; said images being combined by a set of dichroic prisms and transmitted by a fiber-optic cable to the viewing instrument. In a particularly preferred embodiment of the present invention the viewing instrument comprises a binocular having an orientation indicator thereon and a combination of prisms to split the image transmitted by the fiber-optic cable into distinct images for each eyepiece.

BRIEF DESCRIPTION OF THE DRAWINGS

The features of the present invention believed to be novel and unobvious over the prior art are set forth with particularity in the appended claims. The invention itself, however, as to its organization, best mode contemplated by the inventors for carrying it out, method of its operation and advantages thereof, may best be understood by reference to the following description taken in conjunction with the accompanying drawings in which like reference characters refer to like elements throughout, and in which:

DESCRIPTION OF THE PREFERRED EMBODIMENTS

In the present invention a video display system is described which employs computer controlled apparatus to simulate the image seen by a user of a binocular, or a periscope, or for an operator of a vehicle. The viewing instrument may be rotated through a nearly complete rotation in order to simulate the movements of a user of a real world device. In achieving the objective of freeing the viewing instrument for operator movement it is necessary to reduce the bulk and weight of the user's viewing apparatus, in order to allow use without undue effort by the user. In the present invention a fiber-optic cable is employed to transmit the image produced by cathode ray tubes (CRT's) located remotely from the viewer and controlled by an image-generating computer, to the user's viewing instrument.

A binocular represents a particularly difficult problem of simulation. A binocular is a very simple, lightweight instrument that can be pointed in any direction very quickly, and provides a magnified image, having an appropriate increase in detail, of a portion of the scene viewed by the naked eye prior to using the binocular. To simulate such a system requires a special display. The scene presented by the binocular simulator must be associated with the pointing direction of the binocular and should provide a magnification of a portion of an image seen without the binocular. Because a binocular is independent of any other structure, remote detection must be continuously made of the binocular orientation, so that a realistic image may be portrayed to the user. The generated display must be continuously presented at the binocular eyepieces regardless of pointing direction. The present invention accomplishes this by using a set of dedicated CRT's for the binocular mode where the CRT image is piped into the binocular with fiber-optic cable. The content of the scene to be presented depends upon the orientation of the binocular in the given area. Consequently, this orientation must be sensed continuously and accurately.

Figure 1:
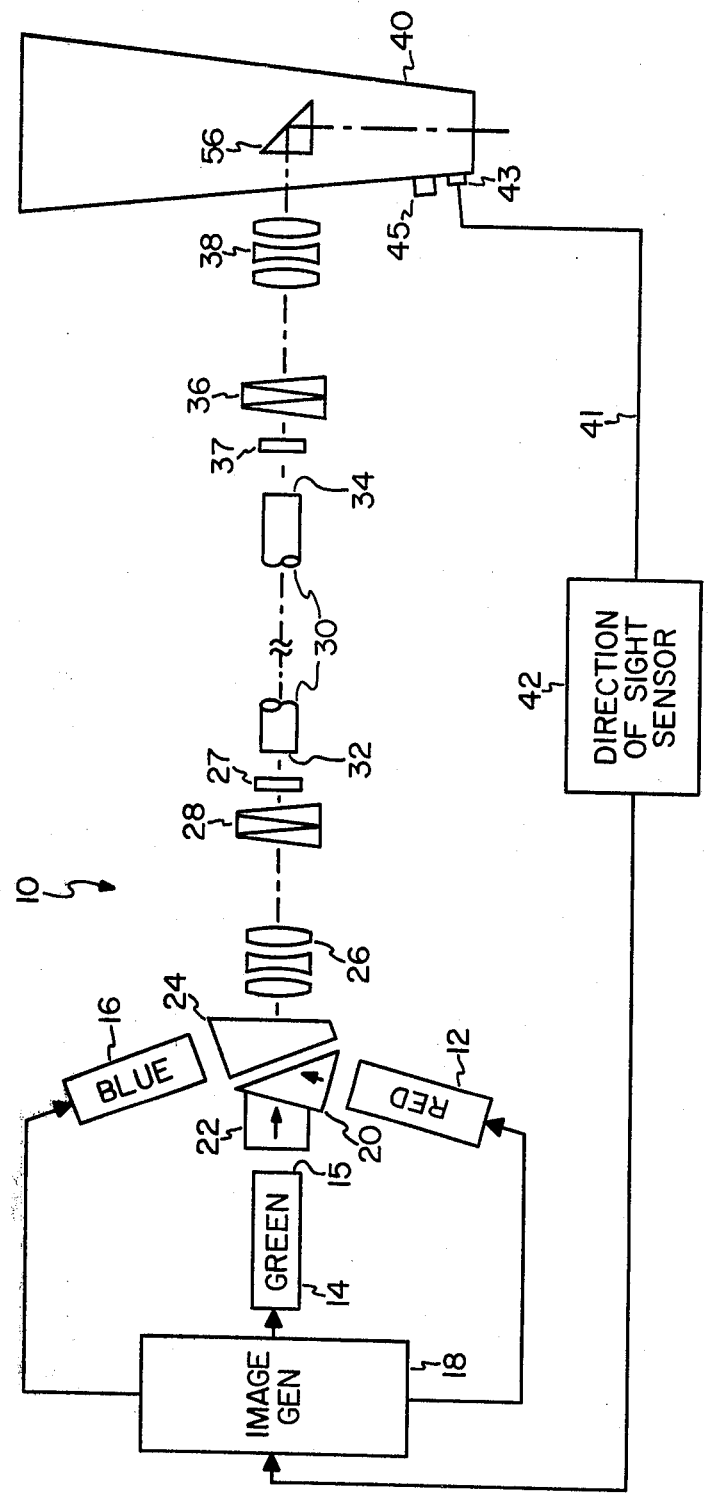
FIG. 1 is a schematic view of a simulator system according to the present invention.

A binocular video display apparatus of the present invention is shown schematically in FIG. 1. The apparatus 10 includes a plurality of CRT's 12, 14, 16 each producing a monochromatic, red, green or blue image, respectively. The CRT's are controlled by image generator 18 which includes a computer which controls the individual images to create a desired composite image as described hereinafter. A plurality of dichroic prisms 20, 22, 24, selected to be compatible with the respective CRT's is positioned in optical alignment with the CRT's, so that the image produced by each CRT is transmitted through a respective one of the prisms 20, 22, 24. The prisms are matched with each other, so that a single polychromatic image, which constitutes a combination of the monochromatic images generated by the CRT's, is transmitted from the dichroic prism 24. A relay lens 26 is disposed in optical alignment with dichroic prism 24, such that the polychromatic image is transmitted through relay lens 26. A constant deviation prism 28 is located in optical alignment with relay lens 26, and a field lens 27 located in optical alignment with prism 28 focuses the image. A fiber-optic cable 30 is disposed with one end 32 thereof in optical alignment with field lens 27. At the end 34 of the fiber-optic cable 30 distal from the CRT's, a field lens 37 is disposed in optical alignment with the fiber-optic cable. Another constant deviation prism 36 is disposed in optical alignment with field lens 37 and transmits the image onto a second relay lens 38 disposed in optical alignment with prism 36. This relay lens 38 focuses the image upon the optics of the binocular 40. The binocular 40 is connected to a sensor 42 via line 41 and dead man switch 43 which activates position transmitter 45 which provides position signals to the image generator 18 as described hereinafter.

Figure 2:
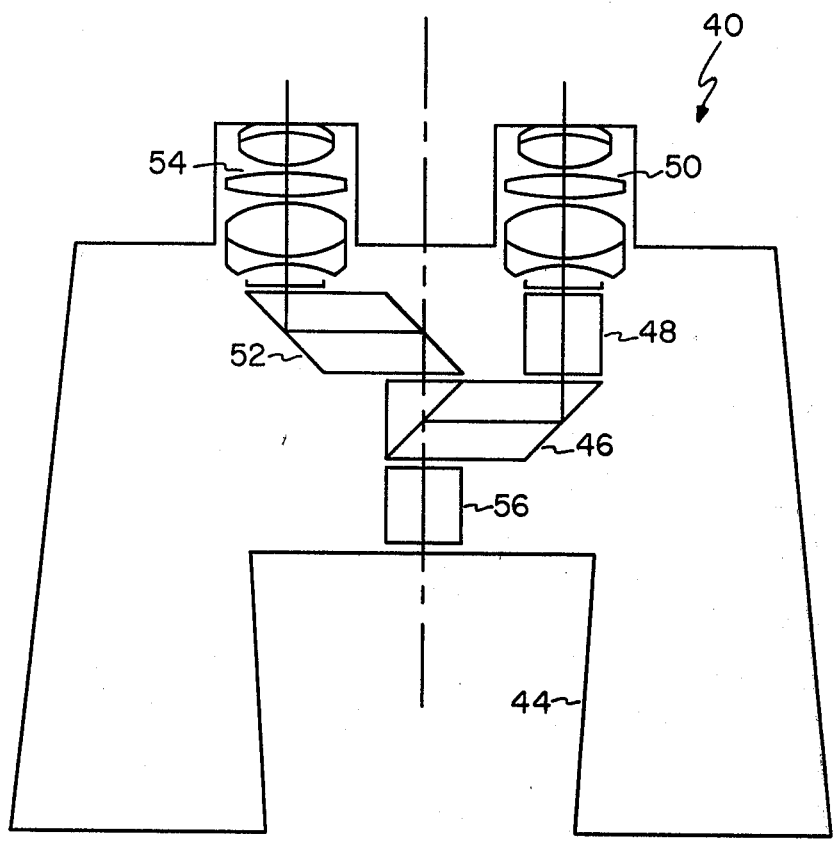
FIG. 2 is a schematic illustration of a binocular viewing instrument for the present invention.

The details of the optics of binocular 40 are shown in detail in FIG. 2. A binocular frame 44 houses optics 40 consisting of a multiplicity of prisms for transmittal of the image to the two separate eyepiece combinations. Prism 56 reflects the image emitted by lens 38, directing the image to the binocular optics. Prism 46 splits the beam, reflecting a portion of the beam through direct view prism 48 to eyepiece optics 50, and transmitting the remainder to a second prism 52 and the eyepiece optics 54.

The system shown in FIGS. 1 and 2 operates as follows: The sensing device 42 detects when the binocular is picked up, e.g., by a signal transmitted via line 41 produced when a switch 43 normally closed by pressure is opened as the binocular is picked up by the user, to initiate control of image generator 18. The switch 43 also may be used to supply electrical power to position transmitter 45, so that transmitter 45 is activated simultaneously with the opening of switch 43. As the user moves the binocular 40 relative to a fixed reference, sensing device 42 tracks the direction of the binocular by signals transmitted by transmitter 45 and provides control signals to the image generator 18. Image generator 18 composes an image from memory based upon the position signal from sensing device 42 by controlling the monochromatic CRT's 12, 14 and 16. The monochromatic images are convergently projected along the ray axis of the respective CRT and combined by the prisms 20, 22 and 24 into a single polychromatic image transmitted from prism 24. Each prism has a display input coupling surface in the optic path of, and orthogonal to, the ray axis of the respective CRT, for receiving the respective display image. Prism 20 abuts prism 22, and is separated by air space from prism 24 at a surface that is oriented at an acute angle to the ray axis of CRT 12. The single polychromatic image emerges orthogonally from the optically downstream surface of prism 24 that is oriented at an acute angle to the ray axis of CRT 16. The image is transmitted through relay lens 26 to constant deviation prism 28. Relay lens 26 focuses the image onto the surface of constant deviation prism 28, so that the complete image produced by the CRT's is transmitted by the system 10. Lens 26 also provides that all of the light produced by the CRT's in making the image impinges upon the prism 28 so that all the light is transmitted to surface of cable 30 at its end 32, thereby providing maximum image sharpness.

The constant deviation prism 28 causes some wavelengths to be deviated upward and other to be deviated downward, such that separate wavelengths originating at a particular point in the image transmitted by the relay lens 26 impinge upon separate fibers at the end face 32 of fiber-optic cable 30, so that separate wavelengths from each point of the image are separately transmitted through the fiber-optic cable. This is called fiber-optic multiplexing or wavelength multiplexing, and provides an increase in resolution of about 50% compared with fiber-optic transmission without such multiplexing. The image at each spot of the covered area is transmitted by fiber-optic cable 30 in separate monochromatic bits and redintegrated at the opposite end of the fiber-optic cable by constant deviation prism 36. Since image information from each spot of the image is transmitted by a plurality of individual fibers in fiber-optic cable 30, failure of a single strand or several strands in the fiber-optic cable will not result in one spot or several spots having no image information transmitted to the prism 36. In the event of failure of some strands of the cable 30 monochromatic bits transmitted by the remaining strands are redintegrated to produce an image at each spot, so that no discontinuities are created in the received image. The beam emitted from prism 28 may directly impinge upon surface 32 of fiber-optic cable 30. However, a field lens 27 may be employed to improve beam transmission. The beam transmitted by a fiber-optic cable is attenuated when the light rays are reflected from the walls of the individual strands of the cable. If the beam is focused so that the central ray entering each respective strand of the fiber-optic cable is parallel to the other central rays, the optimum performance, i.e., minimum attenuation of the beam by the cable, is achieved. If a field lens 27 is positioned a length equal to its focal length from constant deviation prism 28, field lens 27 collimates the individual rays of the beam carrying the image, so that the central rays of light produced by each point of the image are parallel upon entering fiber-optic cable 30. The rays emitted by the fiber-optic cable 30 are collimated by field lens 37 and transmitted to constant deviation prism 36 which redintegrates the image. The image emitted by prism 36 is focused by relay lens 38 onto prism 56, which aligns the image with the binocular optics. The binocular optics then split the image and direct two separate images to the eyepiece optics 50, 54, respectively.

One type of detector 42 for sensing binocular direction relative to a reference established relative to the operator includes a pointing light telescope having a transmitter which points a spot at a specific pixel within a complete TV image. The TV screen has sensing devices such as photo diode and amplifier combinations to pick up the precise spot targeted by the telescope. A sensor within detector 42 detects the line and pixel element on an i and j matrix illuminated by the light telescope. The sensed position on the two coordinates is then fed into a signal processing circuit of the image generator, which causes the CRT's to produce an enlarged image, e.g., by increasing the number of lines and pixels within a particular view, thereby adding detail as seen by the operator of the binocular. The computer generated image including the appropriate magnification is transmitted via the fiber-optic cable and then displayed on the binocular eyepieces for examination by the binocular operator.

An alternative type of position sensor is an electromagnetic system, for example, the type called SPASYN sold by the Advanced Technology Systems Division of the Austin Company of Roselle, N.J. The SPASYN system consists of an electromagnetic sensor fixed in a frame attached to a movable device, such as the binocular of the present invention, and a radiator fixed in a fixed frame electrically connected to a system electronics unit. As described in U.S. Pat. No. 3,983,474, issued Sept. 28, 1976 to Kuipers, a signal produced in the sensor as a result of the modulated vector field issuing from the radiator is detected and operated upon by electronic coordinate transformation and processing circuitry to produce a signal representative of the position of the sensor relative to the radiator.

In conjunction with the present invention a radiator in the form of a cube approximately one inch on each side would be located at some convenient point on the fixed frame and oriented precisely with respect to the scene displayed. The radiator consists of three identical mutually orthogonal coils which are excited to a particular carrier frequency and modulated at a suitable frequency. The radiator receives its excitation from a system electronics unit, which continuously tracks the remote sensor in position and orientation as it is moved with the binocular. The sensor 45 is a tube approximately 0.75 inch in diameter and weighing approximately one-half ounce mounted on the binocular and oriented precisely with respect to the binocular eyepieces. The optics of the binocular and the sensor are boresighted to each other, so that a field generated by the radiator induces signals in the three mutually orthogonal coils in the sensor which provide input signals to the detecting circuitry of the system electronics unit. The system electronics unit provides a signal indicative of the orientation of the binocular, which is then used by a system control network to provide input signals to the image-generating apparatus to provide the required images to the viewing instruments for the operator. As an alternative, electrical capacitive reaction type devices might be employed as position sensing devices. A further alternative position sensor is a mechanical device connecting the binocular and a position indicator having a low inhibitive effect.

Figure 3:
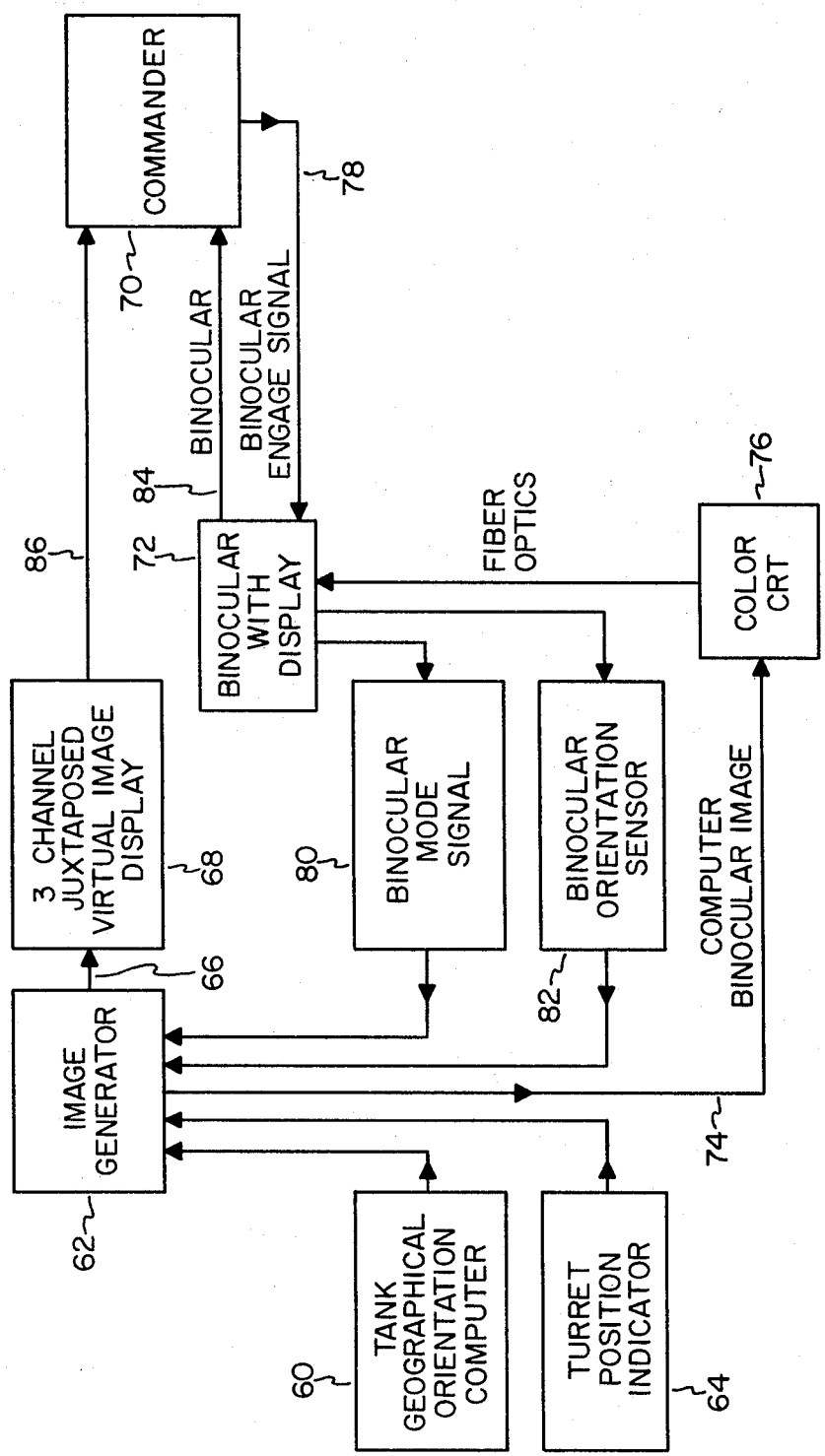
FIG. 3 is a block diagram illustrating the operation of the present invention.

FIG. 3 is a block diagram of a system operating according to the present invention. For a tank simulator a tank geographical orientation computer 60 provides an input to the image generator 62 indicating the position of the tank relative to terrain. A turret position indicator 64 provides a second input to the image generator indicating the position of the tank turret relative to a fixed reference. As a first output, image generator 62 provides a signal 66 to a three channel juxtaposed virtual image display 68 which provides a display for the tank commander 70, who is also the operator of the binocular 72 having simulated image display apparatus. The image generator 62 creates a binocular image signal as a second output 74, which is transmitted to the color CRT's 76, which convert the information from the image generator into display information used by the CRT's to create an image for the binocular with the display apparatus 72. Whenever the commander 70 is using the binocular, the binocular engaged signal 78 is transmitted to the binocular display 72. The binocular display 72 transmits an on-off binocular mode signal 80 to image generator 62 to indicate that the binocular is in use, and the binocular orientation sensor 82 presents to the image generator 62 a signal indicative of the binocular orientation so that the image generator may provide the appropriate information to the three-channel juxtaposed virtual image display 68 and to the binocular 72 to present an image appropriate to the orientation of the binocular. The image generator simultaneously presents an image 84 to the commander through the binocular and another image 86 via the virtual image display which he may observe, and from which he may select an area to be examined in more detail by aiming the binocular with the direction sensor toward a specific part of a three-channel virtual image display.

When using the simulator of the instant invention the tank commander visually scans his three-channel juxtaposed virtual image display for items of interest. When an item is found that he wants to examine more closely, he picks up his binocular and points it in the general direction of that portion of the display. The act of picking up the binocular signals the image generator that the binocular mode is active. The tank commander may adjust the position of the binocular to obtain the view he wants, and the binocular orientation sensor provides orientation signals to the image generator so that the binocular displays a realistic image and image movement. Along with these binocular orientation signals, the continous tank geographical computation and turret position signals are transmitted to the image generator. This satisfies the requirement of the image generator of the present invention to continuously provide the CRT signals appropriate to the binocular image for its present pointing direction relative to a larger simulated display.

Figure 4:
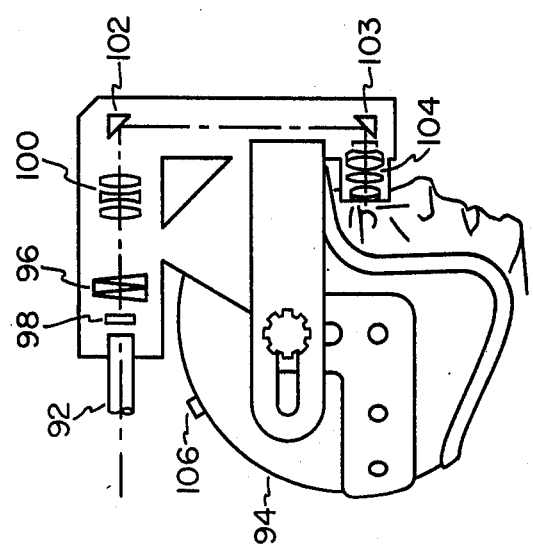
FIG. 4 is a schematic view of a helmet mounted viewing system according to the present invention.

FIG. 4 illustrates the application of the instant invention to a helmet-mounted viewing instrument 90. The fiber-optic cable 92 and the viewing optics are supported by the helmet 94 with suitable attachments. The optics include field lens 98 disposed in optical alignment with fiber-optic cable 92 a constant deviation prism 96 disposed in optical alignment with field lens 98 and relay lens 100 disposed in optical alignment with the prism 96. A prism 102 is disposed in optical alignment with relay lens 100 to reflect the image to prism 103 which directs the image through the viewing optics 104 positioned in front of the user's face. The optics of the helmet-mounted display could provide a separate image for each eye of the user or a single larger display. In this embodiment systems similar to those described for image orientation with respect to the binocular are used, with the modification that the sensor 106 is disposed on the helmet 94, so that the sensed orientation of the user's head causes the image generator to cause the CRT's to generate an image suitable to the particular position of the user's head. The image generator, CRT's, and optics used to provide an image to the fiberoptic cable are the same as described above relative to the binocular simulator. The image generator is the same equipment as that described hereinabove relative to the binocular application, but employs a program specifically designed to provide images suitable for a helmet-mounted type display use, such as for aircraft simulation, or tank operation simulation.

Figure 5:
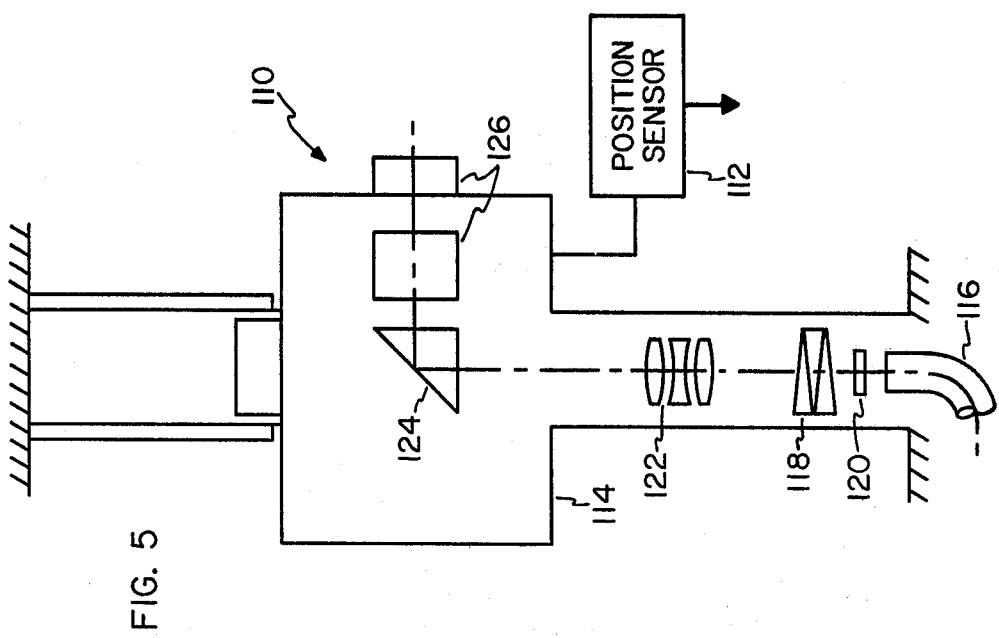
FIG. 5 is a schematic view of a periscope mounted viewing system according to the present invention.

FIG. 5 illustrates the application of the instant invention to a periscope-mounted viewing instrument 110. In this embodiment position sensor 112 need only indicate the angular orientation of the periscope 114, since the viewing instrument would not experience tilt as would a binocular or helmet. In this embodiment the fiberoptic cable 116 is connected to the periscope with field lens 120, constant deviation prism 118, relay lens 122, reflecting prism 124 and viewing optics 126 providing an image display for the user. The image generator, CRT's, and optics used to provide an image to the fiber-optic cable are the same as described above relative to the binocular simulator. The image generator uses the same equipment as that described hereinabove relative to the binocular application, but employs a program specifically designed to provide images appropriate to the simulation of scenes actually observed by periscope users.

In each of the above-described systems the fiber-optic cable may include a fiber-optic bundle of the type sold by American Optical Company designed No. FS-163 having a length of about 3 feet and a minimum bend radius of approximately 6 inches, and approximately 18 inches of relay optics on either end thereof. The cable has an 8×10 millimeter format, 10 micrometer fiber diameter and a fiber acceptance angle of 60 degrees. In its enhanced form it resolves 100 line pairs per millimeter. The CRT will provide 900 discernable scan lines with equivalent resolution at 90 degrees to the lines. The re-imaged CRT scan lines at the smallest image in the system, 8 millimeters by 10 millimeters at the fiber optics, appear on an optical resolution of (900 scan lines)/2÷8 mm (the fiber-optic cable dimension)=56.25 lines pairs per millimeter. As shown in FIG. 1 the imagery between screen-type planes, such as the CRT phosphor surface 15 and the face 32 of fiber-optic cable 30, involves no more than four optical elements, e.g., the prism cluster including prisms 20, 22, 24, lens 26, lens 27 and prism 28. These optical elements would be either designed or selected for their special requirements in the magnification field of view and relative aperture. As such, those optical elements between the CRT's and fiber-optic cable or those optical elements 36, 37, 38 and 50 or 54 between the fiber-optic cable and the observer, both performing as specular imaging systems, will have relatively high combined transfer functions of 0.8. These elements together will decrease the contract of the transmitted image by a factor of 0.64. With a vertical real field of view of 8 degrees, 30 minutes of arc and a resolution of 56.25 lines pairs per millimeter of CRT image at the fiber-optic cable end, the resulting visible angular resolution is, therefore, 1.13 arc minutes per line pair. This provides good contrast in the image received by the user.

The contrast ratio of a 45 deg. beamsplitter-type system has been measured to range between 15 to 1 and 99 to 1 depending upon input target configuration. The factor which most strongly reduces contrast is glare, which may be minimized by the application of a coating of multi-layer anti-reflection material over the surfaces of the lenses. All the optics of the present system including the prisms and the beamsplitter in the binocular must have excellent optical surface finishes. Glare causes the greatest problem at the end faces of the fiber optic bundle. each face contains butt ends of the fiber insulating material that clads each fiber. This insulating material does not convey the image but protects the inner image-conveying fiber and may scatter light. This scattering effect can be reduced by ensuring that the fiber face ends are polished very thoroughly. In order to keep all optical surfaces clean and as free as possible of haze, dirt or dust the whole system is enclosed, including the CRT, the lenses and the fiber optics. By very careful manufacturing the contrast for the overall system will approach 15 to 1. Careful optical design will ensure that collimation of the binocular simulation will be as good as that of the original binocular. Collimation can be assured by shaping the end of the fiber optic bundle so that its image fits the normal eyepiece image surface.

The maximum bright light brightness at the CRT is expected to be approximately 100 ft. lamberts. Each of the relay lenses and eyepieces will have transmissions of close to 85 percent. The prisms can be obtained with transmissions as high as 85 percent. The beamsplitter can be assumed to give a 50–50 split of the light intensity received. The 3 ft. fiber-optic cable will transmit approximately 50 percent or slightly higher of the received light intensity. Table I summarizes the transmission values of the system of the instant invention. The total transmission for each eyepiece is therefore approximately 10 percent. With an input of 100 ft. lamberts at the CRT the observed bright light brightness will be 10 ft. lamberts. Falloff at the edge of the field will be no greater than 25 percent at the CRT's. The cosine for falloff for the remaining system will be kept small by keeping the transmitted field small, less than 15 degrees, for which the falloff would be 4 percent. With these requirements the edge of field brightness will be 7 ft. lamberts or higher.

The invention described herein provides a system for simulating the field of view of the user of optical devices which may be turned through 360 degrees. The images provided are controlled based upon the position of the user's viewing instrument so that a realistic image may be displayed to the user for training purposes without requiring a bulky, uncomfortable attachment to the user's head. This provides a more realistic and less tiring training system.

TABLE I

Binocular System Component Transmission

| | |
|---|---|
| Relay Lens (26) | .85 |
| Field Lens (27) | .97 |
| Prism (28) | .95 |
| Fiber-optic cable (30) | .5 |
| Prism 36 | .95 |
| Field Lens (37) | .97 |
| Relay Lens (38) | .85 |
| Prism (56) | .95 |
| Prism (46) | .95 |
| Beamsplitter division of intensity | .5 |
| Prism (48 or 52) | .95 |
| Eyepiece optics (50 or 54) | .85 |
| TOTAL | 0.111 |

We claim:
1. A video display system, comprising:
three (3) cathode ray tubes, each having a ray axis that is disposed at an angle to the ray axis of the other two, and each producing a monochromatic display image different from the others, such that said ray axes intersect on the viewing side of said tubes when extended;

an image generating computer for controlling the images produced by each of said cathode ray tubes, wherein the first of said tubes produces a red display image, the second of said tubes produces a green display image, and the third of said tubes produces a blue display image;

a matched dichroic prism set of three (3) prisms, each having a display input coupling surface orthogonal to said ray axis of a respective said tube, wherein the display input coupling surface of a first prism of said set is orthogonal to said ray axis of said first tube, the display input coupling surface of a second prism of said set is orthogonal to said ray axis of said second tube, and the display input coupling surface of a thrid prism of said set is orthogonal to said ray axis of said third tube, and wherein a second surface of said second prism abuts a second surface of said first prism, a third surface of said first prism is at an acute angle to said ray axis of said first tube, a second surface of said third prism is separated from said third surface of said first prism by an air space, and a third surface of said third prism is at an acute angle to said ray axis of said third tube, such that said red display image and said green display image are combined in said first prism, and said blue display image is combined with said red and green combined display image in said third prism and together are provided as a polychromatic display image output at said third surface of said third prism;

a first relay lens disposed in substantial optical alignment with said ray axis of said second tube, and in optical alignment with said polychromatic display image output of said third prism;

a first constant deviation prism for separating said image into a plurality of separate distinct wavelength images; said first constant deviation prism being disposed in optical alignment with said first relay lens such that said composite image is focused upon said first constant deviation prism by said first relay lens;

a fiber optic bundle aligned with said first constant deviation prism for transmitting said plurality of distinct wavelength images to a remote location relative to said cathode ray tubes;

a first field lens diposed in optical alignment with said first constant deviation prism and between said first constant deviation prism and said fiber optic bundle for collimating the light rays emitted by said first constant deviation prism;

a second constant deviation prism disposed in optical alignment with said fiber optic bundle for receiving said separate distinct wavelength images from said transmitting means and redintegrating said images into a single composite image;

a second field lens disposed in optical alignment with said fiber optic bundle and between said fiber optic bundle and said second constant deviation prism for collimating the light rays emitted by said light transmitting means;

a second relay lens disposed in optical alignment with said second field lens for focusing said composite image;

a viewing means in optical alignment with said second relay lens for receiving said focused composite image and displaying said composite image to a viewer; and means connected to said viewing means for sensing position of said viewing means relative to a fixed reference and for generating control signals for said means for producing display images, such that said means for producing display images produces an image dependent upon the position of said viewing means relative to a fixed reference.

* * * * *